United States Patent [19]

Siberell

[11] Patent Number: 5,263,202
[45] Date of Patent: Nov. 23, 1993

[54] SECURING APPARATUS FOR CLOTHING

[75] Inventor: Richard J. Siberell, Ventura, Calif.

[73] Assignee: Patagonia, Inc., Ventura, Calif.

[21] Appl. No.: 962,146

[22] Filed: Oct. 16, 1992

[51] Int. Cl.⁵ .............................................. A41F 1/00
[52] U.S. Cl. ......................................... 2/336; 2/341;
2/158; 2/159; 2/237; 24/713.2
[58] Field of Search ................... 2/336, 337, 341, 342,
2/221, 235, 237, 159, 158, 160, 162, 79; 383/72,
73, 74, 75, 76; 24/712.1, 712.2, 713.3, 714.6,
127, 115 G, 115 M, 136 R

[56] References Cited

U.S. PATENT DOCUMENTS

| Re. 33,586 | 5/1991 | Graff | 2/237 |
|---|---|---|---|
| 287,135 | 10/1883 | Lange | 24/714.6 |
| 476,219 | 5/1892 | Walker | 383/74 |
| 515,155 | 2/1894 | Nelson | 383/74 |
| 1,287,354 | 12/1918 | Larign | 2/221 |
| 2,113,731 | 4/1938 | Kennedy | 24/713.2 |
| 3,161,890 | 12/1964 | Betz | 2/237 |
| 4,164,792 | 8/1979 | Ito | 2/237 |
| 4,466,137 | 8/1984 | Carnaghi | 2/237 |
| 4,739,880 | 4/1988 | Sawyer et al. | 383/72 |
| 4,785,960 | 11/1988 | Belisle | 383/74 |
| 4,864,695 | 9/1989 | Gold | 24/713.2 |

FOREIGN PATENT DOCUMENTS

| 936021 | 12/1955 | Fed. Rep. of Germany | 2/237 |
|---|---|---|---|
| 720854 | 11/1966 | Italy | 2/237 |
| 1392200 | 4/1975 | United Kingdom | 2/237 |
| 1406821 | 9/1975 | United Kingdom | 2/221 |

Primary Examiner—Clifford D. Crowder
Assistant Examiner—Amy B. Vanatta
Attorney, Agent, or Firm—Blakely, Sokoloff, Taylor & Zafman

[57] ABSTRACT

An apparatus for releasably securing an opening of a garment is described. The apparatus includes a drawstring, a casing with a window, and a cord lock. The casing has an inner tunnel and encloses the opening. The drawstring runs through the tunnel of the casing. The drawstring extends out of the casing at the window. The cord lock is located at the window inside the casing for locking the drawstring from moving into the casing when the cord lock is in a locking state, and for releasing the drawstring to move freely when the cord lock is in a releasing state. As the drawstring is tightened when the cord lock is in the locking state, the cord lock is prevented from travelling with the drawstring thereby allowing the drawstring to slide through the cord lock.

8 Claims, 3 Drawing Sheets

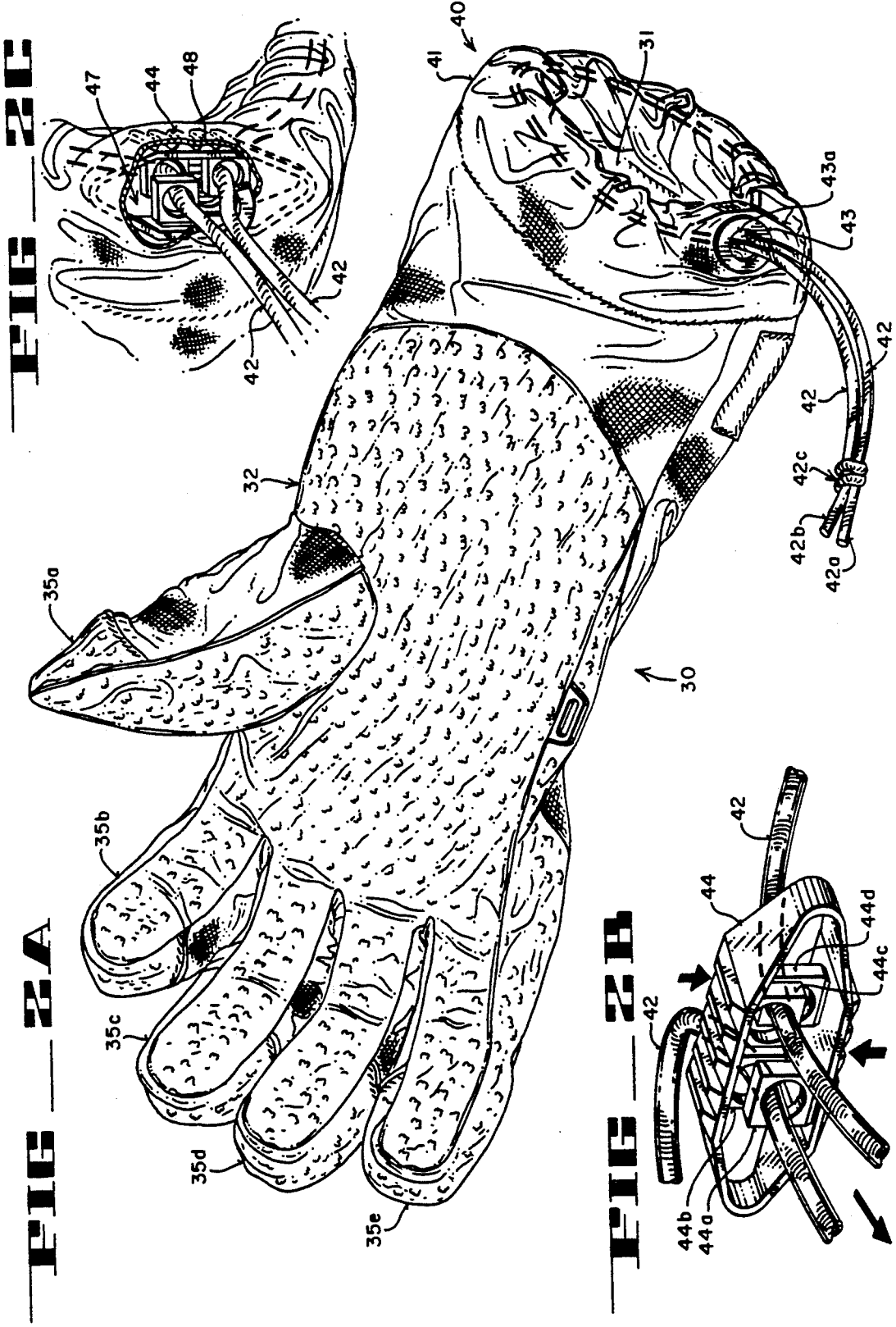

FIG_3
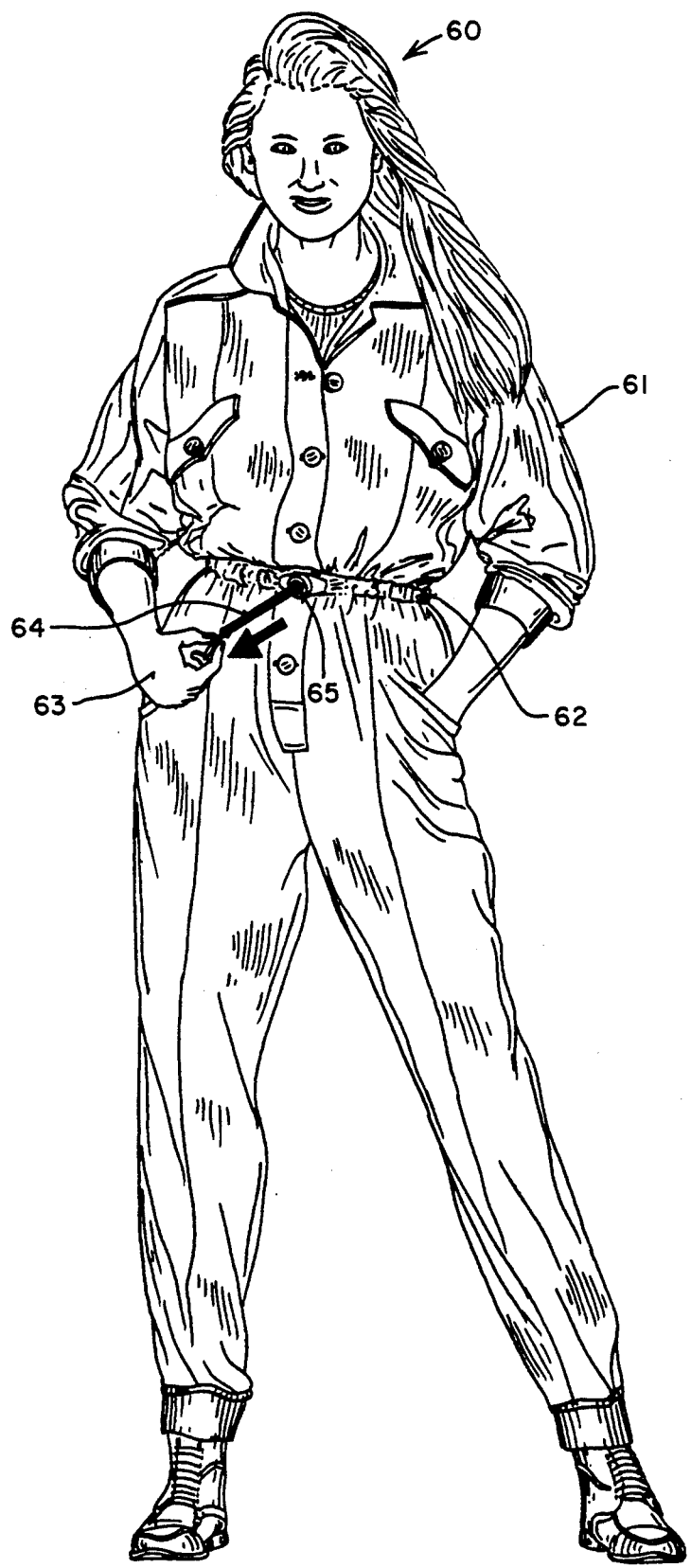

SECURING APPARATUS FOR CLOTHING

FIELD OF THE INVENTION

The present invention pertains to the field of wearing apparels. More particularly, this invention relates to an improved securing apparatus for clothing, wherein the improved apparatus allows the user to secure and release the clothing with one hand, and wherein the improved apparatus constitutes an integrated part of the clothing.

BACKGROUND OF THE INVENTION

A glove is typically an open-ended fitted covering for a user's hand. The edge at the open end of the covering defines an opening of the glove. The opening of the glove typically provides the entry to the inside of the glove for the user's hand such that the user's hand can be put in the glove. When the user's hand is in the glove, the opening of the glove is then typically substantially occupied by the wrist or forearm of the user and the edge of the covering that defines the opening embraces the user's wrist or forearm, thus enclosing the user's hand in the glove.

The main purpose of the glove is to keep the user's hand warm without sacrificing dexterity. Therefore, it is important that the bottom edge of the glove that defines the opening tightly embraces the user's wrist or forearm such that the glove can be secured on the user's hand. This causes the warm air to be contained inside the glove and prevents cold air, snow, etc., from getting inside the glove.

One prior approach to securing the glove on the user's hand is to provide an elastic cuff at the bottom edge of the glove. When the user's hand is entering the glove via the opening, the elastic cuff is forced to expand to allow the user's hand into the glove. When the user's hand is settled in the glove, the elastic cuff tightly encircles the user's wrist and forearm.

One disadvantage of this prior approach is that the elasticity of the elastic cuff decreases over the time that the glove is used. When the elastic cuff is losing its elasticity, the opening formed by the elastic cuff is becoming bigger and bigger and will not tightly embrace the user's wrist and forearm when the user's hand is in the glove.

Another disadvantage is that putting on such a glove with a "gloved-hand" is difficult because of the reduced dexterity of the gloved-hand and because of the tensioned elastic opening at the bottom edge of the glove.

Another prior approach to securing the glove on the user's hand is to provide a belt with a buckle at the bottom edge of the glove. When the user's hand is in the glove, the buckle closes and therefore fastens the belt. This then causes the bottom edge of the glove to tightly embrace the user's wrist or forearm, thus tightly securing the glove on the user's hand.

Disadvantages are also associated with this prior approach. One disadvantage of this prior approach is that it is typically difficult and inconvenient to adjust the length of the belt and operate the buckle with one hand.

Another prior approach to securing the glove on the user's hand is to provide a drawstring at the bottom edge of the glove and a cord lock to releasably lock the drawstring. FIG. 1 shows this prior approach.

In FIG. 1, a glove 10 is shown which includes a main portion 11 and a casing 14 at the open end of main portion 11. Casing 14 defines an opening 12 through which the user's hand enters glove 10. Casing 14 typically includes a circular tunnel (not shown) and an eyelet 15 for providing a pathway from the tunnel to the outside of casing 14. In addition, casing 14 may simply include a circular tunnel with a sewed opening.

A drawstring 13 runs through the tunnel of casing 14. Drawstring 13 is typically an elastic drawstring. The two ends of drawstring 13 extend out of the tunnel through an inner hole 21 of eyelet 15. A cord lock 17 is provided which includes two inner holes 18 and 20. The two ends of drawstring 13 also extend through inner hole 20 of cord lock 17. The two ends of drawstring 13 are then tied together in a pad 16 to prevent drawstring 13 from being accidentally retreated into the tunnel of casing 14 via hole 20 of cord lock 17 and hole 21 of eyelet 15. A spring loaded lock (not shown) is located inside hole 20. The lock snatches drawstring 13. The snatch of the lock at drawstring 13 prevents drawstring 13 from moving freely. A release button 19 is also provided in cord lock 17 to release the lock inside hole 20. Release button 19, when being pressed toward hole 20, releases the lock and drawstring 13 is allowed to move freely. When the force applied to release button 19 is removed, release button 19 returns to its initial position and the lock inside hole 20 snatches drawstring 13 again.

A cord 22 is also provided. Cord 22 extends through hole 18 of cord lock 17. The two ends of cord 22 are then sewed into main portion 11 of glove to form a closed loop. The purpose of cord 22 is to stop cord lock 17 from moving away from eyelet 15 when drawstring 13 is pulled away from eyelet 15. Cord 22 also maintains cord lock 17 within a predetermined distance from eyelet 15. Therefore, due to cord 22, drawstring 13 passes through cord lock 17 when an external force is applied to pull drawstring 13. Cord lock 17 allows the user to secure and release of glove 10 with one hand.

Opening 12 of glove 10 is typically initially at its maximum open capacity. When the user's hand enters glove 10 via opening 12, an external force is typically provided by the other hand of the user at pad 16 to pull drawstring 13 out. This tightens opening 12 which results in casing 14 tightly embraces the user's wrist or forearm to secure glove 10 on the user's hand. Due to cord 22, cord lock 17 will not move with drawstring 13 when the force is used to pull drawstring 13. When the external force is removed from pad 16, the lock inside cord lock 17 prevents drawstring 13 from moving back into casing 14. When the external force is applied to release button 19, the lock inside hole 20 is pushed away from engaging drawstring 13. This unlocks drawstring 13 and allows it to move freely.

Disadvantages are still associated with this prior approach. One disadvantage associated is that cord lock 17 is attached to glove 10 by cord 22 outside casing 14 and does not form an integrated part of glove 10. This causes cord lock 17 to dangle outside glove 10 which sometimes may be very intrusive to the user. In addition, it is also possible for cord lock 17 to freeze with snow and/or ice and therefore become inoperative.

Another disadvantage associated is that cord 22 may be accidentally entangled by or entwined with external objects since the cord forms a closed loop itself external to the outer surface of glove 10. The closed loop may relatively easily catch external objects. This problem is potentially hazardous to the user. Moreover, this may cause cord 22 to break. When cord 22 is broken, cord lock 17 cannot be kept within the predetermined distance from eyelet 15 and will not help to tightly secure glove 10 on the user's hand. If cord 22 is broken, drawstring 13 cannot be used to secure glove 10 by one hand.

SUMMARY AND OBJECTS OF THE INVENTION

One of the objects of the present invention is to provide an improved securing apparatus for a garment which allows a user to secure and release the garment with one hand.

Another object of the present invention is to provide an improved securing apparatus for a garment which allows the user to secure and release the garment with one hand and which minimizes the chance that the garment is entangled by or entwined with an external object.

A further object of the present invention is to provide an improved securing apparatus for a garment which allows the user to secure and release the garment with one hand and the cord lock of which is invisible to the user.

A further object of the present invention is to provide an improved securing apparatus for a garment that allows the user to secure and release the garment with one hand and that forms an integrated part of the garment.

An apparatus for releasably securing an opening of a garment is described. The apparatus includes a drawstring, a casing, an eyelet (or simply an opening in the casing), and a cord lock. The drawstring has a first end and a second end. The casing has an inner tunnel and encloses the opening. The drawstring runs through the tunnel of the casing. The casing includes a window with a surrounding edge. The first and second ends of the drawstring extend out of the casing at the window. The eyelet is mounted on the surrounding edge of the window of the casing for facilitating the drawstring to move through the window. The drawstring passes through the eyelet. The cord lock is located at the window inside the casing for locking the drawstring from moving into the casing when the cord lock is in a locking state, and for releasing the drawstring to move freely when the cord lock is in a releasing state. As the drawstring is tightened when the cord lock is in the locking state, the cord lock is prevented from travelling with the drawstring thereby allowing the drawstring to slide though the cord lock.

According to one aspect of the present invention, the garment is a glove.

According to another aspect of the present invention, the garment is a shirt and the opening is at an end of a sleeve or the bottom edge (i.e., hem) of the shirt.

According to another aspect of the present invention, the garment is a jacket having a bottom and the opening is at the bottom (i.e., hem).

According to another aspect of the present invention, the jacket is sewed to a pair of trousers at the opening such that the jacket and the trousers becomes a unitary garment.

According to yet another aspect of the present invention, the garment is a unitary garment with a waistline and the opening is at the waistline of the unitary garment. More specifically, the unitary garment can be a jump-suit or a ski suit.

According to a still further aspect of the present invention, the garment is a hood and the hood can be attached to a coat at the opening.

According to another aspect of the present invention, the garment is a pair of trousers with a waist end and the opening is at the waist end.

According to another aspect of the present invention, the garment is a pair of trousers and the opening is at a bottom end (i.e., hem) of the trousers.

According to another aspect of the present invention, the garment can be a sock, a hat, a skirt, a bag or luggage bag, or a swim suit, etc.

According to another aspect of the present invention, the cord lock is a one-hand releasable cord lock.

Other objects, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which:

FIG. 2A shows a glove with a securing system according to one preferred embodiment of the present invention, wherein the securing system includes a cord lock;

FIG. 2B shows the cord lock employed in the securing system of FIG. 2A;

FIG. 2C shows the position of the cord lock in the securing system;

FIG. 3 shows another application of the securing system of the present invention shown in FIGS. 2A-2C.

DETAILED DESCRIPTION

Figure 1:
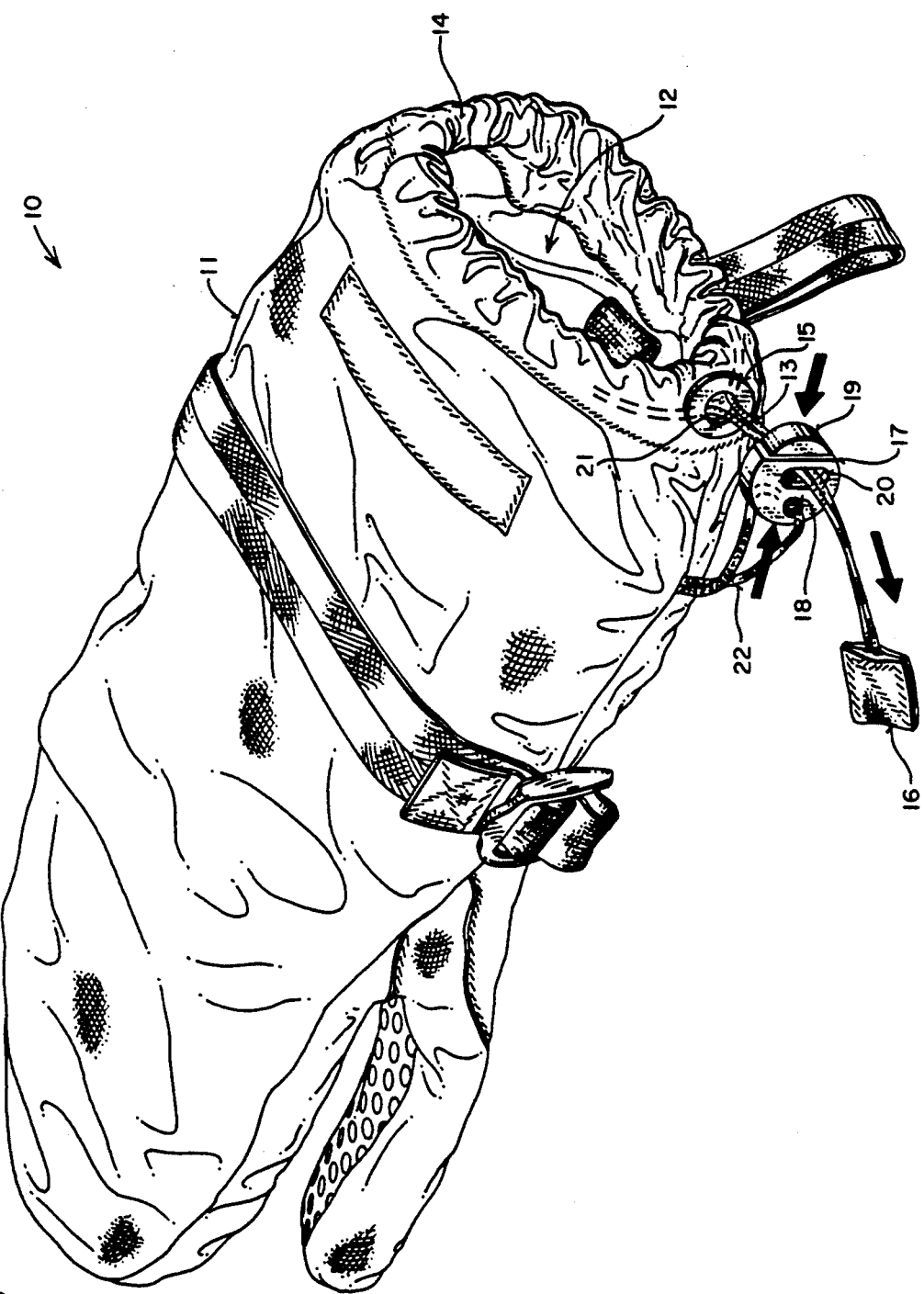
FIG. 1 illustrates a glove with a prior art securing system.

As will be described in detail below, the present invention provides an apparatus for releasably securing an opening of a garment. The apparatus includes a drawstring, a casing with a window, and a cord lock. The drawstring runs through the tunnel of the casing. The first and second ends of the drawstring extend out of the casing at the window. When the drawstring is loosely extending through the tunnel of casing, the opening is at a substantially maximum open capacity. When the drawstring is pulled to move out of the eyelet, the opening is forced to close. The cord lock is located at the eyelet inside the casing for locking the drawstring from moving into the casing when the cord lock is in a locking state, and for releasing the drawstring to move freely when the cord lock is in a releasing state. The first and second ends of the drawstring go through the cord lock. The cord lock is in the releasing state when being squeezed. The cord lock is in the locking state when not being squeezed. The cord lock is invisible. The cord lock is one-hand releasable by a user.

FIGS. 2A through 2C illustrate a glove 30 which employs a securing system 40 at an opening 31 of glove 30, according to one preferred embodiment of the present invention. FIG. 2A illustrates glove 30 with securing system 40. FIG. 2B shows a cord lock 44 employed in securing system 40. FIG. 2C is a cutaway view of a portion of securing system 40, showing the position of cord lock 44 in securing system 40.

Referring to FIGS. 2A-2C, glove 30 includes a main portion 32 for covering the palm and back of a user's hand (not shown), and five sheaths 35a through 35e for the thumb and fingers of the user's hand at one end of main portion 32 of glove 30. The other end of main portion 32 is an open end which forms opening 31 of glove 30. The user's hand enters glove 30 through opening 31.

In alternative embodiments, glove 30 may include fewer than five sheaths. For example, glove 30 may include a thumb sheath and a separate sheath for the four fingers. As a further example, glove 30 may include a thumb sheath, an index finger sheath, and a separate sheath for the remaining fingers.

As described above, the user's hand (not shown) enters glove 30 at opening 31. When the user's hand is settled inside glove 30, opening 31 is substantially occupied by the wrist or forearm (also not shown) of the user.

As described above, glove 30 includes securing system 40. Securing system 40 is located at the open end of glove 30. Securing system 40 defines opening 31. The purpose of securing system 40 is to tightly secure glove 30 on the user's hand. In the currently preferred embodiment, securing system 40 allows the user to secure and release glove 30 with one hand.

Securing system 40 of glove 30 includes a casing 41 which forms the open end of glove 30. Casing 41 encloses opening 31 and therefore defines opening 31. Casing 41 is a edge at the open end of main portion 32 of glove 30 and includes a circular tunnel 47 (shown in FIG. 2C) in it.

Casing 41 includes a window 48 (shown in FIG. 2C) to provide a pathway from tunnel 47 to the outside of casing 41. Therefore, tunnel 47 is not a completely sealed tunnel. Only window provides the pathway from tunnel 47 to the outside of casing 41. An eyelet 43 is mounted on window 48 to reinforce the pathway. Eyelet 43 includes an inner hole 43a. In one preferred embodiment, eyelet 43 is made of a material which is harder than that of casing 41. The purpose of providing eyelet 43 at window 48 is to reduce the friction of the pathway provided by window 48 and to facilitate the movement through window 48. In other preferred embodiments, there is no eyelet mounted at the window of casing 41.

Securing system 40 also includes a cord lock 44 (shown in FIG. 2B). Cord lock 44 is a two-cord cord lock, as shown in FIGS. 2B and 2C. Cord lock 44 is located within tunnel 47 of casing 41. In addition, cord lock 44 is located at window 48, behind eyelet 43. Therefore, cord lock 44 is invisible to the user of glove 30, as shown in FIGS. 2A and 2C. FIG. 2C is the cutaway view of a portion of securing system 40, wherein eyelet 43 is cut away to show the position of cord lock 44 inside casing 41. As can be seen from FIG. 2C, cord lock 44 is located within tunnel 47 at window 48.

As can be seen from FIG. 2B, cord lock 44 includes two sets of locking pads 44a–44b and 44c–44d, each for locking one cord. Initially, cord lock 44 is in the locking state where the cords extending through cord lock 44 are snatched by locking pads 44a–44d of cord lock 44. In this case, the movement of the cords through cord lock 44 can only be made through force to pull the cords. When a force is applied to squeeze cord lock 44 inwardly, as indicated in FIG. 2B, cord lock 44 is in a releasing state and locking pads 44a–44d release the cords. The cords can move freely through cord lock 44. When the squeezing force is removed from cord lock 44, cord lock 44 returns to its initial locking state and locking pads 44a–44d snatch the cords again. When cord lock 44 is in the locking state which locks the cords through it, an external force can be applied to move the cords through cord lock 44.

In the presently preferred embodiment, cord lock 44 is the Bow Cord Lock TM (2 cords) manufactured by ITW Nexus Corporation at Wood Dale, Ill. In alternative embodiments, other types of cord locks may be used.

As shown in FIG. 2A, a drawstring 42 is provided in securing system 40. Drawstring 42 enters tunnel 47 of casing 41 through inner hole 43a of eyelet 43. Drawstring 42 then extends through tunnel 47 and comes out of tunnel 47 through inner hole 43a of eyelet 43. Drawstring 42 has two ends 42a and 42b. The two ends 42a–42b are then tied together to form a knot 42c. Therefore, drawstring 42 forms a closed loop. Alternatively, the two ends 42a–42b of drawstring 42 are sewed in a pad (not shown) to form the closed loop. Moreover, additional hardware or fastening device may be used for securing the closed loop.

As can been seen from FIGS. 2B and 2C, drawstring 42 also extends through cord lock 44 located inside tunnel 48 and behind eyelet 43. When drawstring 42 enters tunnel 47 through inner hole 43a of eyelet 43, drawstring 42 first passes through locking pads 44a–44b of cord lock 44. When drawstring 42 extends through tunnel 47 and is ready to exit tunnel 47 through inner hole 43a of eyelet 43, drawstring 42 passes through locking pads 44c–44d of cord lock 44.

In one embodiment, drawstring 42 is an elastic cord.

In other embodiments, the two ends of drawstring 42 may be hidden inside tunnel 47. For example, the two ends of drawstring 42 may be sewed together or joined by a knot inside casing 41.

Securing system 40 allows the user to secure and release glove 30 with one hand. Securing system 40 also minimizes the chance that glove 30 is entangled by or entwined with an external object. This is due to the reason that cord lock 44 is located inside casing 41. By mounting cord lock 44 behind eyelet 43 and within tunnel 47 of casing 41, cord lock 44 is invisible which also improves the visual appearance of glove 30. Furthermore, when cord lock 44 is located inside casing 41, securing system 40 becomes an integrated part of glove 30. The operation of securing system 40 will be described in more detail below.

Opening 31 of glove 30 is initially at its maximum open capacity. At this time, drawstring 42 loosely extends through tunnel 47. Cord lock 44 of securing system 40 locks drawstring 42 from moving freely. The user's hand can therefore enter glove 30 through opening 31. When the user's hand enters glove 30 via opening 31, an external force is provided by the other hand of the user to pull drawstring 42 outwardly from tunnel 47 of casing 41. As described above, although cord lock 44 locks drawstring 42, it cannot move along with drawstring 42. This is because cord lock 44 is blocked by eyelet 43 to stay inside casing 41. Therefore, drawstring 42 manages to move out of tunnel 47 via cord lock 44 by the external pulling force. This in turn causes opening 31 of glove 30 to become smaller until casing 41 of securing system 40 tightly embraces the user's forearm. In this way, securing system 40 tightly secures glove 30 on the user's hand.

Because cord lock 44 is still in the locking state, drawstring 42 is locked by cord lock 44 and is prevented from moving back into tunnel 47 of casing 41 when the external force to pull drawstring 42 is withdrawn. This is turn maintains casing 41 of securing system 40 to tightly encircles the user's forearm, thus securing glove 30 on the user's hand.

When the external force is applied to cord lock 44 through casing 41 to squeeze cord lock 44 inwardly, as shown in FIG. 2B, cord lock 44 is then in the releasing state and drawstring 42 can move freely through cord lock 44. In this case, drawstring 42 can move into tunnel 47 of casing 41. This in turn causes casing 41 not to tightly encircles the user's forearm and opening 31 to be enlarged, which unlocks glove 30 on the user's hand, thus making it easy for entry and exit of the user's hand.

Securing system 40 of FIGS. 2A-2C can also be used in other garments. For example, securing system 40 can be used in a unitary garment to fasten the waistline of the garment. FIG. 3 illustrates this application.

In FIG. 3, a unitary garment 61 is shown which is put onto a user 60. As shown in FIG. 3, unitary garment 61 is a one piece garment that includes a jacket (or shirt) and an a pair of trousers. The jacket (or shirt) is sewed with the trousers at the waistline to form the one-piece garment. A securing system 62 is located at the waistline of unitary garment 61 to define an opening (not shown) which accommodates the waist of user 60. Securing system 62 is the same as securing system 40. As can be seen from FIG. 3, when user's hand 63 pulls drawstring 64 of securing system 62 outwardly, the opening defined by securing system 60 becomes smaller until securing system 62 tightly embraces the waist of user 60. This therefore causes unitary garment 61 to be fastened on user 60. In one preferred embodiment, drawstring 64 is an elastic cord.

When user's hand 63 squeezes the cord lock (not shown) of securing system 62, drawstring 64 is released to move freely. This causes securing system 62 to unfasten unitary garment 61 on user 60. The cord lock of securing system 62 is located behind eyelet 65 of securing system. Securing system 62 allows user 60 to fasten and unfasten unitary garment 61 with one hand.

In one embodiment, unitary garment 61 is a jumpsuit. In another embodiment, unitary garment 61 is a ski-suit.

As can be seen from FIG. 3, securing system 62 minimizes the chance that garment 61 is entangled by or entwined with an external object. In addition, securing system 62 also improves the visual appearance of garment 61. Furthermore, securing system 62 forms an integrated part of garment 61. These all due to the reason that the cord lock of securing system 62 is not placed out of eyelet 65 and is invisible.

Other uses of the securing system of the present invention include (1) securing a sleeve of a garment; (2) securing a bottom edge or a collar of a jacket or a dress; (3) securing a waist end of a pair of trousers; (4) securing a bottom end of a pair of trousers or a unitary garment; (5) securing a hood; and (6) securing a collar of a shirt, a jacket, or a dress. In addition, the securing system of the present invention can be used to secure a sock or stocking. Moreover, the securing system can also function to secure an opening of a luggage bag or simply a bag.

In the foregoing specification, the invention has been described with reference to specific embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. In a garment having a drawstring which passes through (1) a casing of the garment and (2) a cord lock and release member such that the cord lock and release member (1) locks the drawstring by preventing the drawstring from traveling freely through the cord lock and release member allowing the garment to be tightened and (2) releases the drawstring such that the cord lock and release member unlocks the drawstring allowing the drawstring to travel freely through the cord lock and release member, wherein the drawstring has a cross sectional area, the improvement comprising:

retaining the cord lock and release member within the casing of the garment such that as the drawstring is tightened, the cord lock and release member is prevented from travelling with the drawstring thereby allowing the drawstring to slide through the cord lock and release member in order to tighten the garment when the cord lock and release member locks the drawstring, wherein the cord lock and release member is an independent member and does not constitute part of the casing, wherein the cord lock and release member has a cross sectional area which is greater than the cross sectional area of the drawstring such that the cord lock and release member unlocks the drawstring without reducing the cross sectional area of the drawstring allowing the drawstring to travel freely through the cord lock and release member.

2. The improvement of claim 1, wherein the cord lock and release member is one-hand releasable by a user.

3. An apparatus for releasably securing an opening of a garment, comprising:

(A) a drawstring having a cross sectional area;

(B) a casing having an inner tunnel and located surrounding the opening, wherein the drawstring runs through the tunnel of the casing, wherein the casing includes a window, wherein the drawstring extends out of the casing at the window; and (C) locking and releasing means located at the window inside the casing for locking the drawstring from moving into the casing when the locking and releasing means is in a locking state, and for releasing the drawstring to move freely when the locking and releasing means is in a releasing state, wherein the drawstring runs through the locking and releasing means, wherein as the drawstring is tightened through the locking and releasing means when the locking and releasing means is in the locking state, the locking and releasing means is prevented from travelling with the drawstring thereby allowing the drawstring to slide through the locking and releasing means in order to tighten the casing, wherein the locking and releasing means is an independent member and does not constitute part of the casing, wherein when the locking and releasing means is in the locking state, the locking and releasing means has a cross sectional area which is greater than the cross sectional area of the drawstring, and when the locking and releasing means is in the releasing state, the locking and releasing means unlocks the drawstring without reducing the cross sectional area of the drawstring and does not prevent the drawstring from travelling freely through the locking and releasing means.

4. The apparatus of claim 3, wherein the garment is a glove.

5. The apparatus of claim 3, wherein the garment is a unitary garment with a waistline, wherein the opening is at the waistline of the unitary garment.

6. The apparatus of claim 3, wherein the drawstring is an elastic cord.

7. The apparatus of claim 3, wherein the locking and releasing means is a one-hand releasable cord lock.

8. The apparatus of claim 3, further comprising eyelet means mounted on the window of the casing for facilitating the movement of the drawstring through the window and for enhancing durability of the casing at the window.

* * * * *